United States Patent [19]
Kaeriyama et al.

[11] Patent Number: 5,440,794
[45] Date of Patent: Aug. 15, 1995

[54] METHOD OF MANUFACTURING LAMINATED CERAMIC CAPACITORS

[75] Inventors: Michio Kaeriyama; Masaaki Taniguchi, both of Nagaokakyo, Japan

[73] Assignee: Murata Manufacturing Co., Ltd., Japan

[21] Appl. No.: 126,486

[22] Filed: Sep. 24, 1993

[30] Foreign Application Priority Data

Sep. 25, 1992 [JP] Japan .................. 4-256137

[51] Int. Cl.$^6$ ......................... H01G 7/00; H01G 4/12
[52] U.S. Cl. .................. 29/25.42; 29/25.35; 361/309; 361/321.2
[58] Field of Search ................. 29/25.02, 25.03, 25.35, 29/25.42, 416, 417, 594, 595; 156/89; 264/61; 361/306.3, 308.1, 309, 310, 321.1, 321.2, 321.3; 501/135

[56] References Cited

U.S. PATENT DOCUMENTS

| | | | |
|---|---|---|---|
| 3,766,616 | 10/1973 | Standte | 29/25.35 |
| 4,191,905 | 3/1980 | Yasuda et al. | 29/25.35 X |
| 4,445,256 | 5/1984 | Huguenin et al. | 29/25.35 |
| 4,572,981 | 2/1986 | Zola | 29/25.35 |
| 4,931,901 | 6/1990 | Heron, Jr. | 361/321.2 |
| 4,953,273 | 9/1990 | Insetta et al. | 29/25.42 |
| 5,197,170 | 3/1993 | Senda et al. | 156/89 X |
| 5,245,734 | 9/1993 | Issartel | 29/25.35 |

FOREIGN PATENT DOCUMENTS

| | | | |
|---|---|---|---|
| 23995 | 1/1990 | Japan | 29/25.35 |
| 301118 | 12/1990 | Japan | 29/25.42 |

OTHER PUBLICATIONS

Miller et al "Chip Capacitor Configuration" IBM Technical Disclosure Bulletin, vol. 10, No. 7, Dec. 1967, p. 941.

Primary Examiner—Peter Vo
Attorney, Agent, or Firm—Ostrolenk, Faber, Gerb & Soffen

[57] ABSTRACT

A method of manufacturing an electronic component including a step wherein green-sheets each having one main surface on which a number of first interior electrodes or second interior electrodes are printed and green-sheets each having no printed electrodes are laminated in a direction orthogonally intersecting the respective main surfaces of the green-sheets so as to form a block, which is then fired. The fired block is cut or sliced in the direction orthogonally intersecting the main surface of the green-sheets so as to form a mother board with respective ends of the first interior electrodes and the second interior electrodes exposed on one main surface and the other main surface of the mother board, respectively. Thereafter, respective exterior electrodes are applied onto both main surfaces of the mother board and chips are cut out of the mother board, whereby laminated capacitors each having a first exterior electrode and a second exterior electrode respectively connected to the first interior electrodes and the second interior electrodes can be obtained.

5 Claims, 7 Drawing Sheets

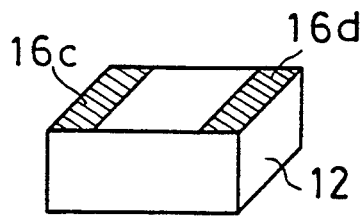
FIG. 7(A)
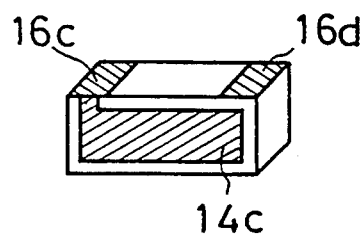
FIG. 7(B)
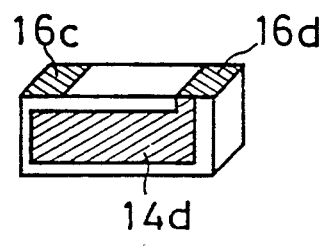
FIG. 7(C)
FIG. 8
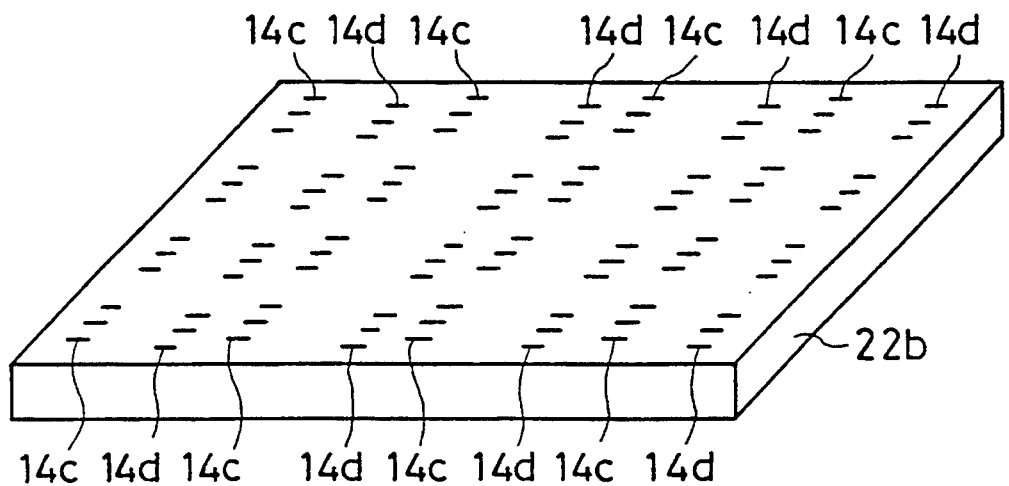

PRIOR ART

METHOD OF MANUFACTURING LAMINATED CERAMIC CAPACITORS

BACKGROUND OF THE INVENTION

1. Field of the Invention

The present invention relates to a manufacturing method of electronic components. More specifically, the present invention relates to a manufacturing method of ceramic electronic components, such as laminated capacitors, LC composite components, LC filters, inductors, etc. Each component has each having interior electrodes and exterior electrodes connected to the interior electrodes.

2. Description of the Prior Art

In a conventional laminated capacitor 1 shown in FIG. 15, after a mother board is cut or diced so as to form a chip 2, exterior electrodes 3 are applied onto the chip 2. In such a conventional manufacturing method, it becomes difficult to apply the exterior electrodes 3 onto the chip 2 because the handling of the chip 2 becomes difficult as the size of the chip 2 is miniaturized.

SUMMARY OF THE INVENTION

Therefore, an object of the present invention is to provide a manufacturing method of electronic components, wherein it is possible to easily apply exterior electrodes onto a chip even when the chip is miniaturized.

An electronic component according to the present invention is obtained by cutting or dicing a mother board to obtain each chip. The manufacturing method comprises the following steps: (a) preparing a mother board having a main surface on which ends of exterior electrodes are exposed; (b) forming exterior electrodes for withdrawing the interior electrodes on the main surface of the mother board; and (c) dicing the mother board.

In a case where a laminated capacitor, for example, is manufactured, a number of individual electrodes, which form the interior electrodes are formed on each of a plurality of ceramic green-sheets (unfired ceramic sheets), and the ceramic green-sheets are then laminated to form a block with the interior electrodes displaced in position from each other for each layer. The block is then fired, and cut or sliced in a direction orthogonally intersecting the main surfaces of the respective green-sheets so as to obtain a mother board.

On at least one main surface of the mother board, an exterior electrode is applied by, for example painting an electric conductive paste on the main surface. At this time, because the interior electrodes are exposed on the main surface of the mother board, the exterior electrode that is applied is connected to the interior electrodes. Thereafter, by cutting chips out of the mother board, laminated capacitors can be obtained.

In accordance with the present invention, since the exterior electrode is applied onto the mother board prior to cutting out the chips, it is possible to easily form the exterior electrode even if the size of the chip is miniaturized.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 7(A) is a perspective view showing another embodiment according to the present invention, and FIG. 7(B) and FIG. 7(C) are partly-broken perspective views of the embodiment shown in FIG. 7(A);

FIG. 8 is a perspective view showing a mother board of the embodiment of FIG. 7;

DETAILED DESCRIPTION OF THE PREFERRED EMBODIMENTS

Figure 1A:
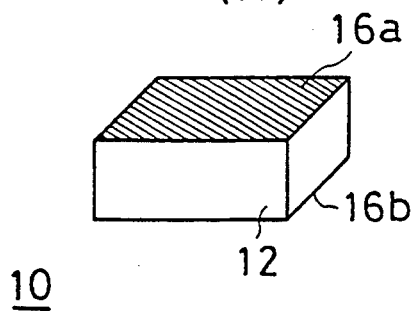
FIG. 1(A) is a perspective view showing one embodiment according to the present invention.
Figure 1B:
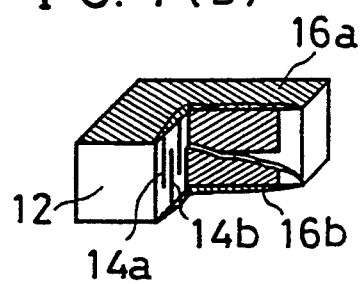
FIG. 1(B) is a partly-broken perspective view of the embodiment shown in FIG. 1(A)

A laminated capacitor 10 according to the embodiment shown in FIG. 1(A) includes a rectangular parallelepiped chip 12, and interior electrodes 14a and 14b that are alternately laminated inside the chip 12 such that one end of the respective interior electrodes 14a are exposed on an upper surface of the chip 12 and one end of the respective interior electrodes 14b are exposed on a lower surface of the chip 12 as shown in FIG. 1(B). Furthermore, exterior electrodes 16a and 16b are applied onto the upper surface and the lower surface of the chip 12, respectively, and the exterior electrodes 16a and 16b are connected to the interior electrodes 14a and 14b, respectively.

Figure 2:
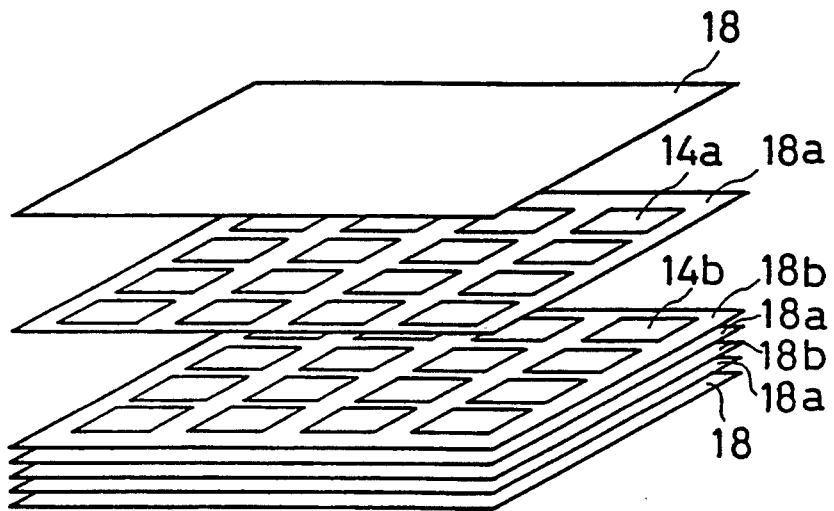
FIG. 2 is an illustrative view showing a step for laminating green-sheets.

Next, a manufacturing method of the laminated capacitor 10 will be described. At first, as shown in FIG. 2, green-sheets 18a each having one main surface on which a number of individual interior electrodes 14a are printed, and green-sheets 18b, each having one main surface on which a number of individual interior electrodes 14b are printed, are alternately laminated in a direction orthogonally intersecting the respective main surfaces of the green-sheets 18a, 18b. Green-sheets 18 with no electrodes are further laminated on an upper most layer of the laminated green-sheets 18a, 18b and a lower most layer. That is, the interior i electrodes 14a and the interior electrodes 14b are printed on the respective green-sheets 18a, 18b such that the positions of the interior electrodes 14a and the positions of the interior electrodes 14b are slightly deviated or displaced from each other. Therefore, when the green-sheets 18a on which the interior electrodes 14a are formed and the green-sheets 18b on which the interior electrodes 14b are formed are alternately laminated, a block 20 (shown in FIG. 3) having alternating layers in which the interior electrodes 14a, 14b are deviated or displaced in position for each layer can be formed. Then, the block 20 is fired. Thus, the block 20 from which a plurality of chips 12 shown in FIG. 6 can be diced is formed.

Figure 3:
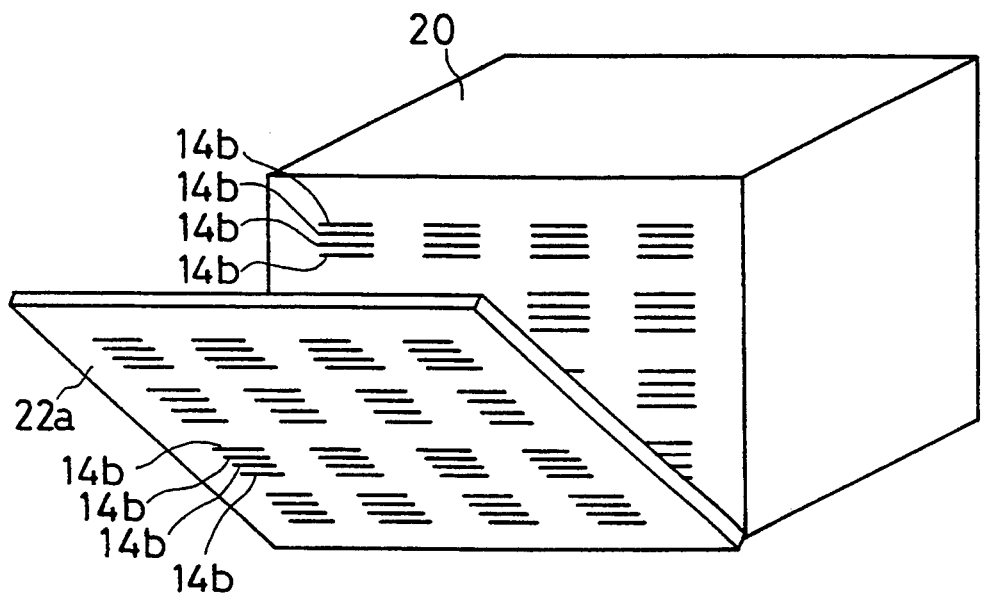
FIG. 3 is an illustrative view showing a step for cutting or slicing a block which is obtained by laminating the green-sheets.
Figure 4:
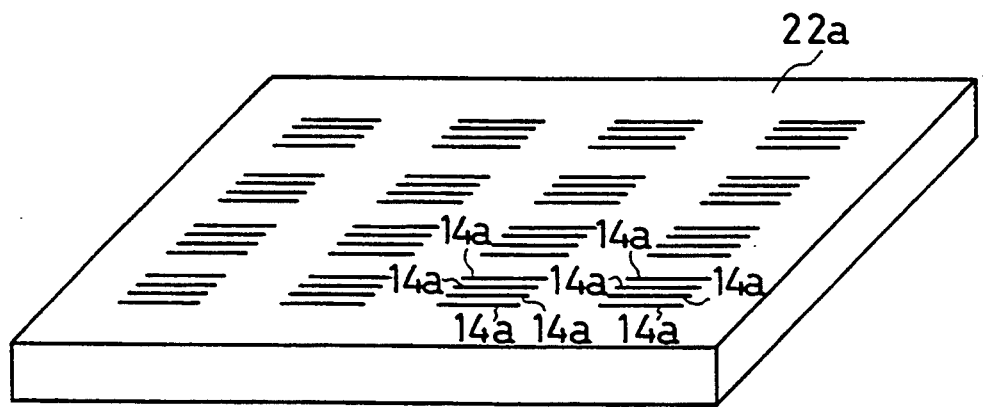
FIG. 4 is a perspective view showing a mother board obtained by cutting or slicing the block.

Then, as shown in FIG. 3, the block 20 is cut or sliced in a direction orthogonally intersecting the main surfaces of the green-sheets 18, 18a, 18b so as to form a mother board 22a. The block 20 is cut such that one end of the respective interior electrodes 14a are exposed on an upper surface, that is, one main surface of the mother board 22a and one end of the respective interior electrodes 14b are exposed on a lower surface, that is, the other surface of the mother board 22a.

Figure 5:
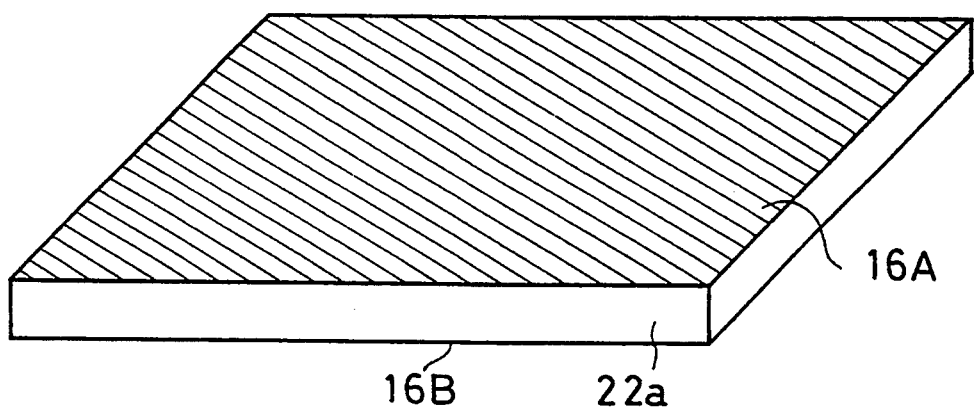
FIG. 5 is an illustrative view showing a step for applying exterior electrodes onto the mother board.

Next, as shown in FIG. 5, exterior electrodes 16A and 16B are applied onto the upper surface and the lower surface of the mother board 22a, respectively, by painting an electric conductive paste on whole areas of the upper surface and the lower surface, respectively. In addition, in order to apply the exterior electrodes 16A and 16B onto the mother board, instead of painting the electric conductive paste the painting of an electric conductive paint, dry plating, electroless plating, etc. may also be utilized.

Figure 6:
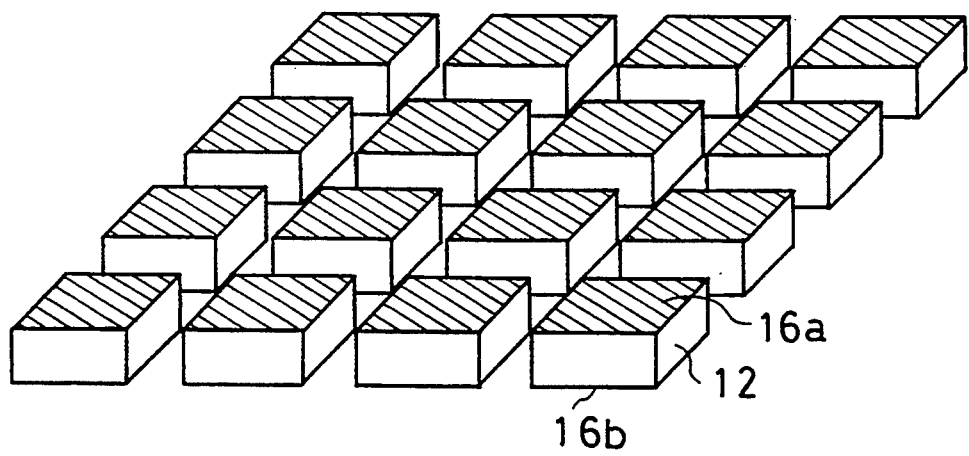
FIG. 6 is an illustrative view showing a step for cutting chips out of the mother board on which the exterior electrodes have been formed.

Thereafter, by dicing the mother board 22a, that is, by cutting chips 12 out of the mother board 22a in a direction orthogonally intersecting the main surface of the mother board 22a as shown in FIG. 6, the laminated capacitors 10, shown in FIG. 1(A) each having the exterior electrodes 16a and 16b are obtained.

In addition, although in the above described embodiment the block 20 is fired prior to it being sliced to form the mother board 22a, the firing process may be executed after the block is instead of the block sliced, that is, the mother board may be fired.

In another embodiment of the invention shown in FIG. 7(A), inside a chip 12 of a laminated capacitor 10 interior electrodes 14c and 14d, each having an approximately L-letter shape shown in FIG. 7(B) and FIG. 7(C), are alternately laminated. One end of the respective interior electrodes 14c, that is, the ends of the shorter sides of the L-letters are exposed at a left end portion of an upper surface of the chip 12, (as shown in FIG. 7b) and one end of the respective interior electrodes 14d, that is, the ends of the shorter sides of the L-letters are exposed at a right end portion on the upper surface of the chip 12 (as shown in FIG. 7(c)). Furthermore, exterior electrodes 16c and 16d are applied at the left end portion and the right end portion on the upper surface of the chip 12 with the exterior electrodes 16c and 16d being connected to the respective exposed ends of the interior electrodes 14c and 14d.

The laminated capacitor 10 of the embodiment shown in FIG. 7 can be manufactured according to the following method.

At first, according to a method similar to the method of manufacturing the laminated capacitor 10 shown in FIG. 1(A), a block is formed. More specifically, although not shown in detail, green-sheets each having a number of individual interior electrodes 14c and green-sheets each having a number of individual interior electrodes 14d are alternately laminated, and green-sheets each having no electrodes are further laminated on an upper most layer and a lower most layer, respectively, of the laminated green-sheets such that a block is formed. Then, the block is cut or sliced in a direction orthogonally intersecting the main surfaces of the green-sheets so as to form a mother board 22b(shown in FIG. 8). The block is cut such that one end of the respective interior electrodes 14c and 14d are exposed on an upper surface, that is, at one main surface of the mother board 22b, as shown in FIG. 8.

Figure 9:
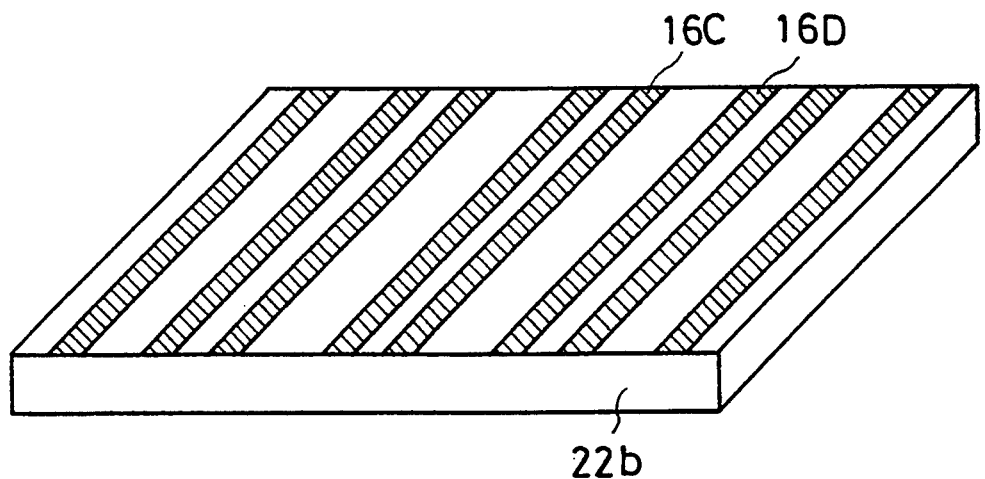
FIG. 9 is an illustrative view showing a step for applying exterior electrodes onto the mother board of FIG. 8.

Next, as shown in FIG. 9, by painting an electric conductive paste on the upper surface of the mother board 22b, exterior electrodes 16C and 16D, each having a stripe form, are applied onto the upper surface of the mother board 22b with the exterior electrodes 16C and 16D being connected to the exposed ends of the interior electrodes 14c and 14d, respectively.

Figure 10:
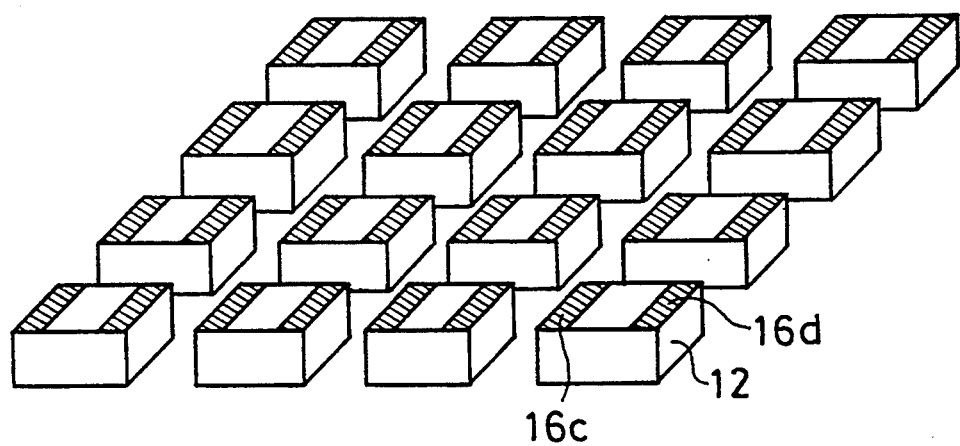
FIG. 10 is an illustrative view showing a step for cutting the mother board on which the exterior electrodes have been formed.

Thereafter, as shown in FIG. 10, chips 12 are cut out of the mother board 22b, whereby the laminated capacitors 10 shown in FIG. 7(A) are formed, each having the two exterior electrodes 16c and 16d on its upper surface.

Figure 11A:
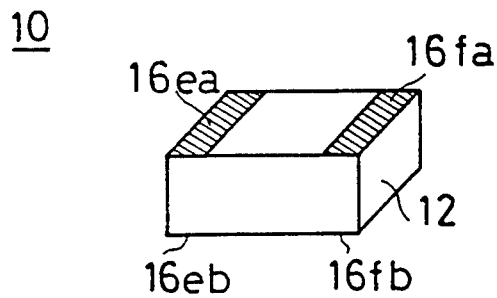
FIG. 11(A) is a perspective view showing another embodiment according to the present invention.
Figures 11B, 11C:
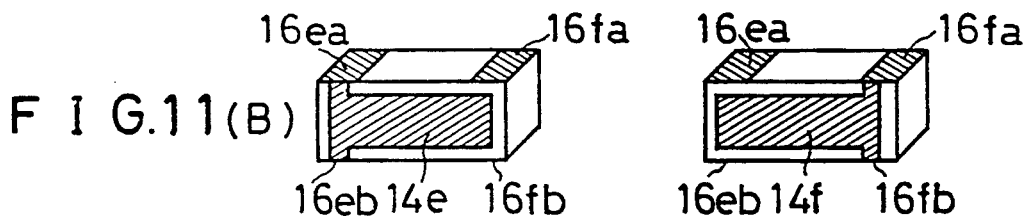
FIG. 11(B) and FIG. 11(C) are partly-broken perspective views of the embodiment shown in FIG. 11(A)

A laminated capacitor 10 according to yet another embodiment shown in FIG. 11(A) includes a chip 12, and within the chip 12, interior electrodes 14e and 14f, each having a T-letter shape, as shown in FIG. 11(B) and FIG. 11(C), are alternately laminated. As shown in relation to FIG. 11(B) and FIG. 11(C), both ends of the shorter sides of the interior electrodes 14e are exposed at left end portions of an upper surface and a lower surface of the chip 12, respectively, and both ends of the shorter sides of the interior electrodes 14f are exposed at right end portions of the upper surface and the lower surface of the chip 12, respectively. Furthermore, exterior electrodes 16ea and 16fa are formed at both ends on the upper surface of the chip 12 and are connected to the interior electrodes 14e. Exterior electrodes 16eb and 16fb are applied at both ends on the lower surface of the chip 12 and connected to the interior electrodes 14f.

In order to obtain the laminated capacitor 10, strip exterior electrodes that are similar to the exterior electrodes 16C and 16D shown in FIG. 9 are applied onto an upper surface and a lower surface of a mother board that is similar to the mother board 22b, and thereafter, each chip 12 is cut-out.

Figure 12:
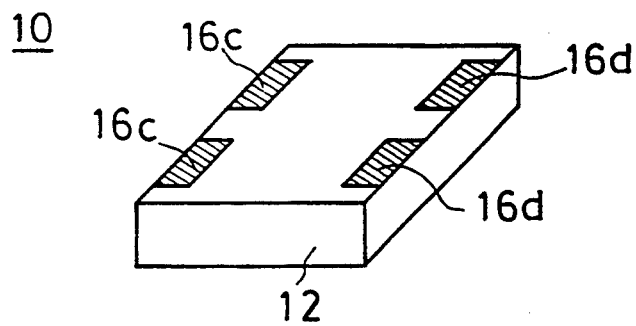
FIG. 12 is a perspective view showing another embodiment according to the present invention.

A laminated capacitor 10 according to another embodiment shown in FIG. 12 includes two laminated capacitors 10 shown in FIG. 7(A). The exterior electrodes 16c and 16d are formed with a predetermined distance in between such that the interior electrodes 14c and 14d of adjacent laminated capacitors 10 are not short-circuited.

Figure 13:
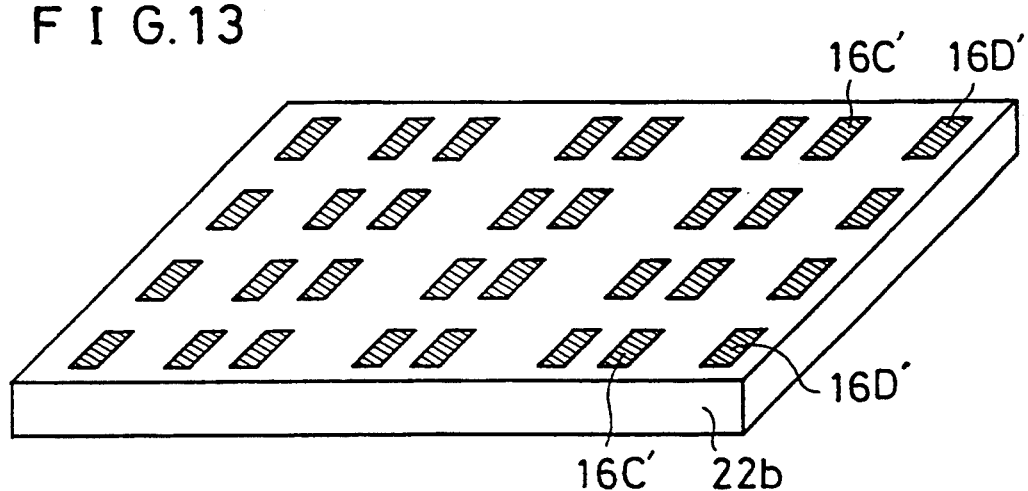
FIG. 13 is an illustrative view showing a step for applying exterior electrodes onto a mother board, which is utilized for the embodiment of FIG. 12.

In order to obtain the laminated capacitor 10, a plurality of individual strip exterior electrodes 16C' and 16D' are formed on the upper surface of the mother board 22 shown in FIG. 8 and are connected to the respective ends of the interior electrodes 14c and 14d that are exposed on the upper surface. Thus, the mother board 22b shown in FIG. 13 is obtainable. The mother board 22b is cut or diced so as to obtain laminated capacitors 10 shown in FIG. 12, each having two pairs of exterior electrodes.

Figure 14:
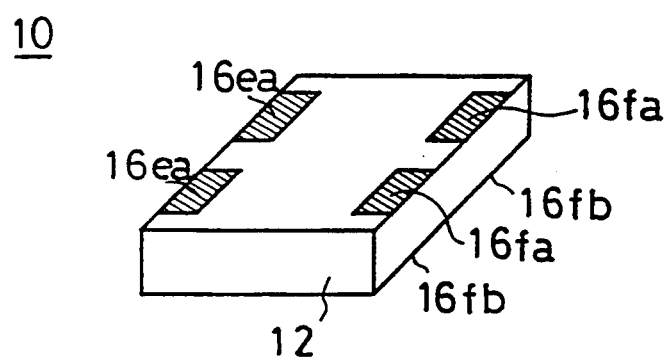
FIG. 14 is a perspective view showing yet another embodiment according to the present invention.
Figure 15A:
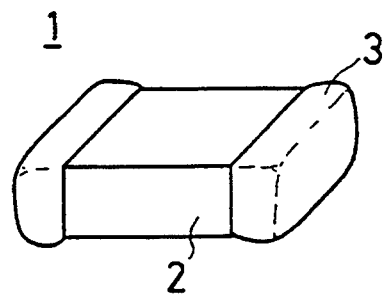
FIG. 15(A) is a perspective view showing a prior art, laminated capacitor
Figure 15B:
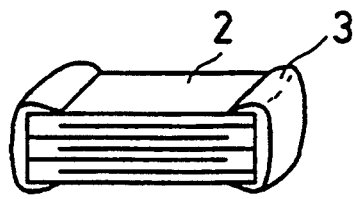
FIG. 15(B) is a cross-sectional view of the prior art capacitor.

A laminated capacitor 10 according to yet another embodiment is shown in FIG. 14 and includes two of the laminated capacitors 10 shown in FIG. 11(A). Two pairs of exterior electrodes 16ea, and 16fa, and 16eb, 16fb are applied onto the upper surface and the lower surface of the chip 12, respectively.

In order to obtain the laminated capacitor 10, strip exterior electrodes similar to the exterior electrodes 16C' and 16D' that are shown in FIG. 13 are formed on the upper surface as well as the lower surface of a mother board that is similar to the mother board 22b, and then, each chip 12 is cut-out.

Although the present invention is applied to a laminated capacitor in all of the above described embodiments; it is needless to say that the present invention can be also applied to any kind of electronic component having an interior electrode and an exterior electrode that is connected to the interior electrode, such as LC composite components, LC filters, inductors, and etc.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing laminated ceramic capacitors by cutting chips out of a mother board, said method comprising the steps of:
   (a) preparing a mother board having a first and second main surface, interior electrodes in the mother board with respective ends of the interior electrodes exposed on at least one of said main surfaces of the mother board,
   wherein said mother board is prepared by the steps of:
   (a-1) preparing a plurality of green-sheets, each green-sheet having at least one main surface, a plurality of individual interior electrodes formed on the respective main surfaces of the green-sheets;
   (a-2) forming a block by laminating said plurality of green-sheets in a direction orthogonally intersecting the respective main surfaces of the green-sheets; and
   (a-3) forming the mother board by slicing said block in a direction orthogonally intersecting the respective main surfaces of said green-sheets;
   (b) forming exterior electrodes electrically connected with said respective ends of the interior electrodes, said exterior electrodes being formed on said at least one of said main surfaces of said mother board; and
   (c) dicing said mother board to obtain respective chips of said laminated ceramic capacitors.

2. The method according to claim 1, wherein said interior electrodes in the mother board include a first group and a second group of interior electrodes; step (a-1) includes preparing a first set of green-sheets having first individual interior electrodes formed on the respective main surfaces thereof such that when said mother board is formed respective ends of the first group of interior electrodes are exposed on the first main surface of said mother board, and a second set of green-sheets having second individual interior electrodes formed on the respective main surfaces thereof such that when said mother board is formed respective ends of the second group of interior electrodes are exposed on the second main surface of said mother board; and step (a-2) includes alternately laminating said first green-sheets and said second green-sheets.

3. The method according to claim 2, wherein step (b) includes the step: (b-1) forming a first exterior electrode and a second exterior electrode, said first and second exterior electrode being electrically connected to said first interior electrodes and said second interior electrodes, respectively.

4. The method according to claim 1, wherein said interior electrodes in the mother board include a first group and a second group of interior electrodes; step (a-1) includes preparing a first set of green-sheets having first individual interior electrodes formed on the respective main surfaces thereof such that when said mother board is formed respective ends of said first group of interior electrodes are exposed on the first main surface of said mother board, and a second set of green-sheets having second individual interior electrodes formed on the respective main surfaces thereof such that when said mother board is formed respective ends of said second group of interior electrodes are also exposed on said first main surface of said mother board, said respective ends of said second interior electrodes being located at positions separated from positions of said respective ends of said first interior electrodes; and step (a-2) includes alternately laminating said first green-sheets and said second green-sheets.

5. The method according to claim 4, wherein step (b) includes the step: (b-1) forming a first exterior electrode and a second exterior electrode, said first exterior electrode and said second exterior electrode being electrically connected to said first interior electrodes and said second interior electrode, respectively.

* * * * *